(12) United States Patent
Nguyen et al.

(10) Patent No.: US 9,567,482 B2
(45) Date of Patent: Feb. 14, 2017

(54) COMB-LIKE POLYETHERALKANOLAMINES IN INKS AND COATINGS

(71) Applicant: Huntsman Petrochemical LLC, The Woodlands, TX (US)

(72) Inventors: Duy T Nguyen, Houston, TX (US); Howard P Klein, Austin, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 0 days.

(21) Appl. No.: 14/831,925

(22) Filed: Aug. 21, 2015

(65) Prior Publication Data
US 2015/0353761 A1  Dec. 10, 2015

Related U.S. Application Data

(62) Division of application No. 12/376,413, filed on Feb. 4, 2009, now Pat. No. 9,238,766.

(51) Int. Cl.
| | |
|---|---|
| C08G 59/50 | (2006.01) |
| C08G 63/00 | (2006.01) |
| C08L 63/00 | (2006.01) |
| C08K 5/36 | (2006.01) |
| C08K 5/09 | (2006.01) |
| C08K 5/10 | (2006.01) |
| C08K 5/00 | (2006.01) |
| C09D 163/00 | (2006.01) |
| C08G 59/06 | (2006.01) |
| C08G 59/14 | (2006.01) |

(52) U.S. Cl.
CPC .......... C09D 163/00 (2013.01); C08G 59/066 (2013.01); C08G 59/1477 (2013.01); *C08G 2650/56* (2013.01)

(58) Field of Classification Search
CPC . C09D 163/00; C08G 59/066; C08G 59/1477; C08G 2650/56
USPC ....... 523/400, 414, 456, 458, 461, 453, 459, 523/457, 455
See application file for complete search history.

(56) References Cited

U.S. PATENT DOCUMENTS

| | | |
|---|---|---|
| 4,421,906 A | 12/1983 | Waddill et al. |
| 4,597,794 A | 7/1986 | Ohta et al. |
| 5,085,698 A | 2/1992 | Ma et al. |

(Continued)

FOREIGN PATENT DOCUMENTS

| | | |
|---|---|---|
| DE | 10123451 A1 | 11/2002 |
| EP | 0270126 | 8/1988 |

(Continued)

OTHER PUBLICATIONS

Notice of Opposition Jul. 31, 2012 by BYK-Chemie GmbH to European Patent 1 745 104 (Translation).

(Continued)

*Primary Examiner* — David Karst
(74) *Attorney, Agent, or Firm* — Huntsman Petrochemical LLC

(57) ABSTRACT

Provided herein are compositions useful as ink or coatings which contain novel dispersants that are capable of dispersing pigments which are traditionally difficult to disperse while maintaining acceptable levels of viscosity. Use of dispersants as taught herein enables the preparation of a wide variety of inks and coatings having high pigment loading and existing within a conventionally-useful viscosity range.

16 Claims, 2 Drawing Sheets

(56) References Cited

U.S. PATENT DOCUMENTS

| | | |
|---|---|---|
| 5,302,197 A | 4/1994 | Wickramanayke et al. |
| 5,530,043 A | 6/1996 | Zawacky et al. |
| 5,567,748 A | 10/1996 | Klein et al. |
| 5,585,446 A * | 12/1996 | Marten .................. C08G 59/10 525/423 |
| 5,589,522 A | 12/1996 | Beach et al. |
| 5,634,971 A | 6/1997 | Baker |
| 5,684,078 A | 11/1997 | Pfaffenschlager et al. |
| 5,948,843 A | 9/1999 | Boutier et al. |
| 6,077,884 A | 6/2000 | Hess et al. |
| 6,303,672 B1 | 10/2001 | Papalos et al. |
| 6,803,408 B2 | 10/2004 | Anderson et al. |
| 6,818,053 B2 | 11/2004 | Kasai et al. |
| 7,005,473 B2 | 2/2006 | Ramesh et al. |
| 2002/0086230 A1 | 7/2002 | Shinjo et al. |
| 2003/0004258 A1 | 1/2003 | L'Alloret |
| 2005/0020735 A1 * | 1/2005 | Krappe ................. B01F 17/005 523/440 |

FOREIGN PATENT DOCUMENTS

| | | |
|---|---|---|
| EP | 1486524 | 12/2004 |
| JP | 10-120759 A | 5/1998 |

OTHER PUBLICATIONS

The JEFFAMINE(R) Polyetheramines Product Data Sheet, Huntsman Corporation, 2007.

K. F Darragas, H. P, Klein, "Water-reducible coatings via epoxy resin modification", International Waterborne High-Solids and Powder Coatings Symposium, New Orleans, LA Feb. 18-20, 1998.

Rompp Chemical Dictionary : Keyword "Inks", 1999.

Rompp Chemical Dictionary : Keyword "Cellulose", 1996.

Rompp Chemical Dictionary : Keyword "Printing Ink", 1997.

* cited by examiner

COMB-LIKE POLYETHERALKANOLAMINES IN INKS AND COATINGS

CROSS-REFERENCES TO RELATED APPLICATIONS

This Application is a Divisional of U.S. application Ser. No. 12/376,413, pending. The noted application is incorporated herein by reference.

FIELD OF THE INVENTION

The present invention relates to a non-aqueous and aqueous pigmented inks and coatings, wherein the pigment dispersant is a polyetheralkanolamine comb polymer, and method of making the same. This invention also relates to aqueous pigmented inks which can be used in ink jet printers and pigmented coatings.

BACKGROUND INFORMATION

When a pigment is used as a colorant, an ink composition is prepared by mixing the concentrated pigment dispersion which contains pigment, water, dispersant and the like with water, resin, a water-soluble organic medium, and other ingredients.
U.S. Pat. No. 6,818,053 discloses a production process for producing a pigment dispersion comprising the steps of (a) providing a mixture consisting essentially of a pigment, a dispersant, a polysiloxane surfactant and/or an alkanediol, a polyhydric alcohol and water; and (b) dispersing the mixture to produce the pigment dispersion. The patent also claims an ink composition prepared from the above pigment dispersion.

In pigmented ink compositions, the pigment dispersion is generally stabilized by a dispersant which serves to prevent the pigment particles from agglomerating and settling out of the carrier. U.S. Pat. No. 5,085,698 discloses an ink composition comprising pigment, aqueous medium, and an acrylic/acrylate block copolymer as a stabilizing agent. U.S. Pat. No. 5,589,522 employs a graft polymer comprising a hydrophilic polyacrylic acid backbone and hydrophobic segment side chains in an aqueous ink composition. U.S. Pat. No. 4,597,794 discloses an aqueous ink dispersion for ink jet printers in which pigment is contained in a polymer having ionic hydrophilic segments and aromatic hydrophobic segments that adhere to the pigment surface.

U.S. Pat. No. 5,948,843 relates to a lithographic printing ink containing a dispersing agent of a reaction product of a styrene/maleic anhydride (SMA) copolymer and an alcohol as a pigment dispersant. U.S. Pat. No. 5,302,197 employs hydroxyl-terminated branched polymer off a short carbon chain in an ink jet ink.

While prior pigmented ink compositions showed acceptable stability for the pigment dispersion, improved pigment ink dispersion is still needed to further lower the ink viscosity, impart better print density, increase pigment loading, and lower degree of shear thinning after aging. It is therefore an object of the present invention to provide an improved pigmented ink composition.

Additionally, pigments may be incorporated into pigmented coating compositions by mixing a pigment dispersion and a grind resin. The coating composition may further include additives such as crosslinkers, solvents, additional polymer resins, flow and appearance control agents, fillers, and the like.

In general, the coating compositions may be used to provide a protective layer, which is ascetically pleasing, on metals, alloys, composites, plastics, concrete, cast iron, wood, ceramic, paper, film, foil, vinyl, textile, glass, leather, and the like materials. In particular, the coating compositions disclosed herein may be applied to the surfaces of automobiles, automobile parts, decks, fences, homes, and the like surfaces.

U.S. Pat. No. 7,005,473 discloses a pigment dispersion used in solventborne coating compositions. The patent further discloses the use of a polymeric pigment disperant as the grind resin to incorporate the pigment into the pigment dispersion for solventborne coating compositions. U.S. Pat. No. 7,005,473 is hereby incorporated by reference in full, to the extent that its disclosure does not contradict the instant disclosure.

While prior pigmented coating compositions showed acceptable stability for the pigment dispersion, improved pigment dispersion is still needed to further lower the coating viscosity, impart better print density, increase pigment loading, and lower degree of shear thinning after aging. It is therefore an object of the present invention to provide an improved pigmented coating composition.

The present invention thus defines a novel and inventive class of dispersant materials useful in formulating inks, coatings, and the like, including ink formulations and pigmented coating compositions comprising such dispersant materials as defined herein.

SUMMARY OF THE INVENTION

Definitions

As used herein, the term "reaction" or "reacting" mean combining more than one reactant, or combining one or more reactant in the presence of an initiator and/or a catalyst.

As used herein, the term "dispersant" means a comb polymer. Suitable comb polymers and methods of making the same are disclosed below herein.

As used herein, the term "pigmented dispersion" means a mixture of the dispersant and a suitable pigment. Suitable pigments are disclosed below herein.

As used herein, the term "hydrocarbyl", when referring to a substituent or group is used in its ordinary sense. Specifically, it refers to a group having a carbon atom directly attached to the remainder of the molecule and having predominantly hydrocarbon character. Examples of hydrocarbyl substituents or groups include: (1) hydrocarbon (including e.g., alkyl, alkenyl, alkynyl) substituents, alicyclic (including e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy); (3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.)

For the purposes of this application, the weight average molecular weight is given by:
where $n_i$ is the number fraction of molecules of molecular weight $M_i$.

$$M_w = \frac{\sum_i n_i M_i^2}{\sum_i n_i M_i}$$

The number average molecular weight is given by:

$$M_n = \frac{\sum_i n_i M_i}{\sum_i n_i}$$

where $n_i$ is the number fraction of molecules of molecular weight $M_i$. $M_w$, and $M_n$ are typically determined by Gel Permeation Chromatography as disclosed in Macromolecules, Vol. 34 Number 19, Page 6812 (2001).

For purpose of this invention and the claims thereto, viscosity was measured using a Brookfield Viscometer; Tint Strength (Sherwin Williams Superpaint Flat Interior Latex Extra White to dispersion, 50 parts to 0.50 parts respectively)—mixed on a Hauschild mixer for 1 minute at 1800 rpm. Drawdowns of the tint mixture versus standard were made on Leneta 3NT-4 regular bond stock using a #20 wire wound rod; color, transparency, and gloss was determined by testing prints made with 360P 113 anilox on Leneta 3NT-3, film, and foil. Further all percentages are by weight and all molecular weights are $M_w$, unless otherwise noted or indicated by the context.

The present invention provides ink or coating compositions which comprise:
a) a pigment component; and b) an effective pigment-dispersing amount of a dispersant having the structure:

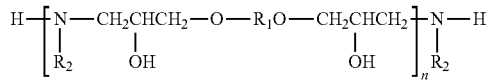

in which $R_1$ may be any $C_1$-$C_{100}$ aliphatic hydrocarbyl group; $R_2$ may be any alkoxylated hydrocarbyl group defined by the structure:

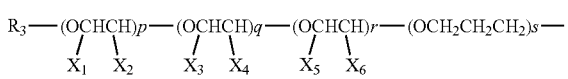

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1.

In another embodiment, this invention relates to:
1) A composition comprising:
a) a pigment component; and
b) an effective pigment-dispersing amount of a dispersant having the structure:

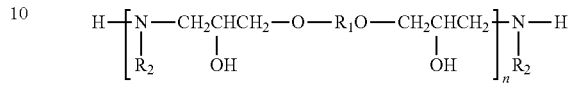

in which $R_1$ may be any $C_1$-$C_{100}$ aliphatic hydrocarbyl group; $R_2$ may be any alkoxylated hydrocarbyl group defined by the structure:

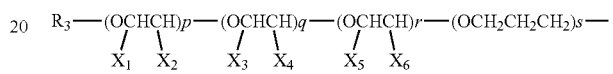

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1.

2) The composition according to paragraph 1, wherein the pigment component is selected from the group consisting of phthalocyanine, carbon black, titanium oxides, chromates, sulfides, iron oxides, azo lakes, insoluble azo pigment, condensed azo pigments, chelate azo pigments, monoazo pigments, monoarylide, B-naphthol, naphthol AS, benzimidazolone, metal precipitated azo, disazo pigments, diarylide, disazo condensation, diazopyrazoione, bisacetoacetarylide, phthalocyanine pigments, perylenes, perylene, perinone pigments, anthraquinone pigments, quinacridone pigments, dioxazine pigments, thioindigo pigments, isoindolinone pigments, quinophthalone pigments, base dye lakes, acid dye lakes, nitro pigments, nitroso pigments, aniline black daylight fluorescent pigments, graphite carbon, isoindoline, isoindolinon, indigoid, diketopyrrolopyrrole, triarylcarbonium, metal complexes, pearl, liquid crystal pigments, fluorescence, and functional derivatives of the above-mentioned pigments.

3) The composition according to paragraphs 1 or 2, further comprising a solvent.

4) The composition according to paragraph 3, wherein said solvent comprises one or more organic solvents selected from the group consisting of: polyhydric alcohols; glycols; diols; glycol esters; glycol ethers; polyalkyl glycols; lower alkyl ethers of polyhydric alcohols; alcohols having fewer than about 8 carbon atoms per molecule; ketones; ethers; esters; and lactams.

5) The composition according to paragraph 3, wherein the solvent comprises water.

6) The composition of paragraph 3, wherein the solvent is selected from the group consisting of water; hexane; mineral spirits; toluene; soy bean oil; castor oil; tall oil fatty acids; polyhydric alcohols; glycols; diols; glycol esters; glycol ethers; polyalkyl glycols; lower alkyl ethers of polyhydric alcohols; alcohols having fewer than about 8 carbon atoms per molecule; ketones; ethers; esters; lactams, ethylene glycol, propylene glycol; butanediol; pentanediol; glycerol; propylene glycol laurate; polyethylene glycol; ethylene glycol monomethyl ether, ethylene glycol mono-ethyl ether; ethylene glycol mono-butyl ether; alcohols having fewer than about 8 carbon atoms per molecule such as methanol, ethanol, propanol, iso-propanol; acetone; dioxane; ethyl acetate, propyl acetate, tertiary-butyl acetate, and 2-pyrrolidone.

7) The composition of paragraphs 3-6, wherein the amount of said solvent component present is any amount between about 10% and 99% by weight based on the total weight of said composition.

8) The composition of paragraphs 3-7, wherein the amount of said solvent component present is any amount between about 50% and 99% by weight based on the total weight of said composition.

9) The composition of paragraphs 1-8, wherein the composition comprises from about 1 weight % to about 80 weight % pigment, based on the total weight of the composition.

10) The composition of paragraphs 1-9, wherein the composition comprises from about 1 weight % to about 40 weight % pigment, based on the total weight of the composition.

11) The composition of paragraphs 1-10, wherein the composition comprises from about 2 weight % to about 10 weight % pigment, based on the total weight of the composition.

12) The use of the dispersant as described in paragraphs 1-12 in an ink composition or a coating composition.

13) A dispersion comprising water, a pigment, and the dispersant as described in paragraph 1.

14) A dispersion comprising an organic solvent according to any foregoing claim, a pigment, and a dispersant as described in paragraph 1.

15) A composition according to paragraphs 1-14, wherein said pigment comprises any pigment as stated in any foregoing claim.

16) The use of a dispersant within the scope of the limitations specified for the dispersant component of a composition according to paragraphs 1-15, in an ink or coating which is either applied to or intended to be applied to a substrate which comprises a material selected from the group consisting of cellulose, any olefin polymer, glass, polyester, polyvinylchloride, polyamides, polyurethane, metal composites, and the like.

17) Any liquid ink composition which comprises a material falling within the definition of the dispersant component of the composition specified in paragraphs 1-16.

18) An article comprising an ink or a coating, wherein the ink further comprises:

a) a pigment component; and
b) an effective pigment-dispersing amount of a dispersant having the structure:

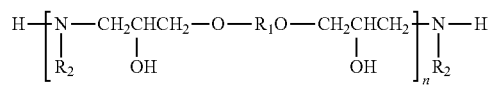

in which $R_1$ may be any $C_1$-$C_{100}$ aliphatic hydrocarbyl group; $R_2$ may be any alkoxylated hydrocarbyl group defined by the structure:

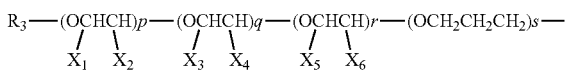

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1.

19) The article of paragraph 18, wherein the article is formed from a material selected from the group consisting of metals, alloys, composites, plastics, concrete, cast iron, wood, ceramic, paper, film, foil, vinyl, textile, glass, and leather.

20) A process for the formation of an ink or coating composition comprising:
a) reacting a monofunctional amine-terminated polyether and a glycidyl ether of a polyol to form a dispersant; and
b) contacting the dispersant and a pigment to form a pigment dispersion.

21) The process of paragraph 20, wherein the glycidyl ether of the polyol comprises aromatic epoxide groups, and wherein 20 to 90 percent of the aromatic epoxide groups of the glycidyl ether of the polyol are reacted with the monofunctional amine-terminated polyether.

22) The process of paragraph 20, wherein the glycidyl ether of the polyol comprises aliphatic epoxide groups, and wherein 20 to 100 percent of the aliphatic epoxide groups of the glycidyl ether of the polyol are reacted with the monofunctional amine-terminated polyether.

23) The process of paragraphs 20 or 22, wherein the monofunctional amine-terminated polyether is a polyetheramine.

24) The process of paragraphs 20 to 23, wherein the monofunctional amine-terminated polyether and the glycidyl ether of the polyol are reacted under a temperature of from about 50° C. to about 150° C.

25) A composition comprising:
a) a pigment component; and
b) an effective pigment-dispersing amount of a dispersant having the structure:

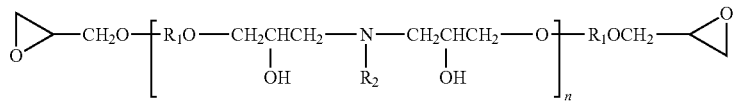

in which $R_1$ may be any $C_1$-$C_{100}$ hydrocarbyl group; $R_2$ may be any alkoxylated hydrocarbyl group defined by the structure:

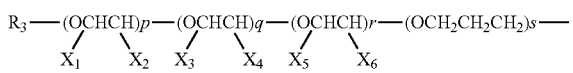

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1.

26) A composition according to paragraph 25, wherein the pigment component is selected from the group consisting of phthalocyanine, carbon black, titanium oxides, chromates, sulfides, iron oxides, azo lakes, insoluble azo pigment, condensed azo pigments, chelate azo pigments, monoazo pigments, monoarylide, B-naphthol, naphthol AS, benzimidazolone, metal precipitated azo, disazo pigments, diarylide, disazo condensation, diazopyrazoione, bisacetoacetaryide, phthalocyanine pigments, perylenes, perylene, perinone pigments, anthraquinone pigments, quinacridone pigments, dioxazine pigments, thioindigo pigments, isoindolinone pigments, quinophthalone pigments, base dye lakes, acid dye lakes, nitro pigments, nitroso pigments, aniline black daylight fluorescent pigments, graphite carbon, isoindoline, isoindolinon, indigoid, diketopyrrolopyrrole, triarylcarbonium, metal complexes, pearl, liquid crystal pigments, fluorescence, and functional derivatives of the above-mentioned pigments.

27) A composition according to paragraphs 25 or 26, further comprising a solvent.

28) A composition according to paragraph 27, wherein said solvent comprises one or more organic solvents selected from the group consisting of: polyhydric alcohols; glycols; diols; glycol esters; glycol ethers; polyalkyl glycols; lower alkyl ethers of polyhydric alcohols; alcohols having fewer than about 8 carbon atoms per molecule; ketones; ethers; esters; and lactams.

29) The composition according to paragraph 27, wherein the solvent comprises water.

30) The composition of paragraph 27, wherein the solvent is selected from the group consisting of water; hexane; mineral spirits; toluene; soy bean oil; castor oil; tall oil fatty acids; polyhydric alcohols; glycols; diols; glycol esters; glycol ethers; polyalkyl glycols; lower alkyl ethers of polyhydric alcohols; alcohols having fewer than about 8 carbon atoms per molecule; ketones; ethers; esters; lactams, ethylene glycol, propylene glycol; butanediol; pentanediol; glycerol; propylene glycol laurate; polyethylene glycol; ethylene glycol monomethyl ether, ethylene glycol mono-ethyl ether; ethylene glycol mono-butyl ether; alcohols having fewer than about 8 carbon atoms per molecule such as methanol, ethanol, propanol, iso-propanol; acetone; dioxane; ethyl acetate, propyl acetate, tertiary-butyl acetate, and 2-pyrrolidone.

31) The composition of paragraphs 27 to 30, wherein the amount of said solvent component present is any amount between about 10% and 99% by weight based on the total weight of said composition.

32) The composition of paragraphs 27 to 31, wherein the amount of said solvent component present is any amount between about 50% and 99% by weight based on the total weight of said composition.

33) The composition of paragraphs 25 to 32, wherein the composition comprises from about 1 weight % to about 80 weight % pigment, based on the total weight of the composition.

34) The composition of paragraphs 25 to 33, wherein the composition comprises from about 1 weight % to about 40 weight % pigment, based on the total weight of the composition.

35) The composition of paragraphs 25 to 34, wherein the composition comprises from about 2 weight % to about 10 weight % pigment, based on the total weight of the composition.

36) The use of the dispersant as described in paragraphs 25 to 35 in an ink or coating composition.

37) A dispersion comprising water, a pigment, and the dispersant as described in paragraph 25.

38) A dispersion comprising an organic solvent according to any foregoing claim, a pigment, and a dispersant as described in paragraph 25.

39) A composition according to either paragraphs 25 to 38, wherein said pigment comprises any pigment as stated in any foregoing claim.

40) The use of a dispersant within the scope of the limitations specified for the dispersant component of a composition according to paragraphs 25 to 39 herein, in an ink which is either applied to or intended to be applied to a substrate which comprises a material selected from the group consisting of cellulose, any olefin polymer, polyethers, polyvinylchloride, glass, polyamides, polyurethane, metal composites, and the like.

41) Any liquid ink composition which comprises a material falling within the definition of the dispersant component of the composition specified in paragraphs 25 to 40.

42) An article comprising an ink or a coating,
   wherein the ink further comprises:
   a) a pigment component; and
   b) an effective pigment-dispersing amount of a dispersant having the structure:
   in which $R_1$ may be any $C_1$-$C_{100}$ hydrocarbyl group; $R_2$ may be any alkoxylated

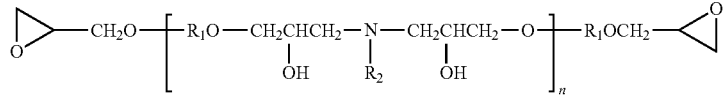

hydrocarbyl group defined by the structure:

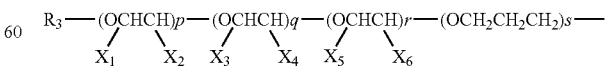

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1.

43) The article of paragraph 42, wherein the article is formed from a material selected from the group consisting of metals, alloys, composites, plastics, concrete, cast iron, wood, ceramic, paper, film, foil, vinyl, textile, glass, and leather.

44) A process for the formation of an ink or a coating composition comprising:
 a) reacting a monofunctional amine-terminated polyether and a glycidyl ether of a polyol to form a dispersant; and
 b) contacting the dispersant and a pigment to form a pigment dispersion.

45) The process of paragraph 44, wherein the glycidyl ether of the polyol comprises aromatic epoxide groups, and wherein 20 to 90 percent of the aromatic epoxide groups of the glycidyl ether of the polyol are reacted with the monofunctional amine-terminated polyether.

46) The process of paragraph 44, wherein the glycidyl ether of the polyol comprises aliphatic epoxide groups, and wherein 20 to 100 percent of the aliphatic epoxide groups of the glycidyl ether of the polyol are reacted with the monofunctional amine-terminated polyether.

47) The process of paragraphs 44 or 46, wherein the monofunctional amine-terminated polyether is a polyetheramine.

48) The process of paragraphs 44 to 47, wherein the monofunctional amine-terminated polyether and the glycidyl ether of the polyol are reacted under a temperature of from about 50° C. to about 150° C.

49) A composition comprising:
 a) a pigment component;
 b) an effective pigment-dispersing amount of a dispersant having the structure:

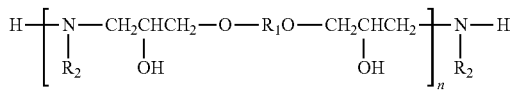

in which $R_1$ may be any $C_1$-$C_{100}$ hydrocarbyl group; $R_2$ may be any alkoxylated hydrocarbyl group defined by the structure:

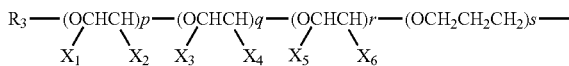

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1; and
 c) a grind resin.

50) The composition of paragraph 49, wherein the grind resin and the dispersant are the same.

51) The composition of paragraphs 49 or 50, wherein the grind resin comprises:
 a) a styrene, substituted-stryene monomer, or combinations thereof and
 b) a carboxylated monomer, wherein the carboxylated monomer is selected from the group consisting of substituted or unsubstituted acrylic acid, methacrylic acid, maleic acid, the half esters of maleic acid, citriconic acid, itaconic acid, and combinations thereof.

52) The composition of paragraphs 49 to 51, wherein the grind resin is a styrene acrylate.

53) The composition of paragraphs 49 to 52, wherein the viscosity of the composition is less than or equal to the viscosity of the dispersant for all shear rates, and wherein the viscosity of the composition is less than or equal to the viscosity of the grind resin for all shear rates.

54) The composition of paragraphs 49 to 53, wherein composition comprises from about 0.1 weight % to about 40 weight % grind resin, based on the weight of the pigment.

55) The composition of paragraphs 49 to 54, wherein the pigment component is selected from the group consisting of phthalocyanine, carbon black, titanium oxides, chromates, sulfides, iron oxides, azo lakes, insoluble azo pigment, condensed azo pigments, chelate azo pigments, monoazo pigments, monoarylide, B-naphthol, naphthol AS, benzimidazolone, metal precipitated azo, disazo pigments, diarylide, disazo condensation, diazopyrazoione, bisacetoacetarylide, phthalocyanine pigments, perylenes, perylene, perinone pigments, anthraquinone pigments, quinacridone pigments, dioxazine pigments, thioindigo pigments, isoindolinone pigments, quinophthalone pigments, base dye lakes, acid dye lakes, nitro pigments, nitroso pigments, aniline black daylight fluorescent pigments, graphite carbon, isoindoline, isoindolinon, indigoid, diketopyrrolopyrrole, triarylcarbonium, metal complexes, pearl, liquid crystal pigments, fluorescence, and functional derivatives of the above-mentioned pigments.

56) The composition of paragraphs 49 to 55, wherein the composition comprises from about 1 weight % to about 80 weight % pigment, based on the total weight of the composition.

57) The composition of paragraphs 49 to 56, wherein the composition comprises from about 1 weight % to about 40 weight % pigment, based on the total weight of the composition.

58) The composition of paragraphs 49 to 57, wherein the composition comprises from about 2 weight % to about 10 weight % pigment, based on the total weight of the composition.

59) The composition according to paragraphs 49 to 58 further comprising a solvent.

60) The composition of paragraph 59, wherein the solvent is selected from the group consisting of water; hexane; mineral spirits; toluene; soy bean oil; castor oil; tall oil fatty acids; polyhydric alcohols; glycols; diols; glycol esters; glycol ethers; polyalkyl glycols; lower alkyl ethers of polyhydric alcohols; alcohols having fewer than about 8 carbon atoms per molecule; ketones; ethers; esters; lactams, ethylene glycol, propylene glycol; butanediol; pentanediol; glycerol; propylene glycol laurate; polyethylene glycol; ethylene glycol monomethyl ether, ethylene glycol mono-ethyl ether; ethylene glycol mono-butyl ether; alcohols having fewer than about 8 carbon atoms per molecule such as methanol, ethanol, propanol, iso-propanol; acetone; dioxane; ethyl acetate, propyl acetate, tertiary-butyl acetate, and 2-pyrrolidone.

61) The composition of paragraphs 59 or 60, wherein the amount of said solvent component present is any amount between about 10% and 99% by weight based on the total weight of said composition.
62) The composition of paragraphs 49 to 61, wherein the amount of said solvent component present is any amount between about 50% and 99% by weight based on the total weight of said composition.
63) The use of the dispersant of paragraphs 49 to 62 in a coating composition.
64) An article comprising a coating,
wherein the coating further comprises:
a) a pigment component;
b) an effective pigment-dispersing amount of a dispersant having the structure:

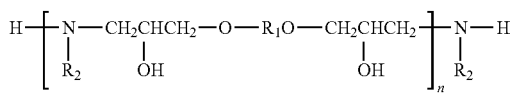

in which $R_1$ may be any $C_1$-$C_{100}$ hydrocarbyl group; $R_2$ may be any alkoxylated hydrocarbyl group defined by the structure:

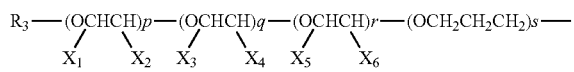

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1; and c) a grind resin.

65) The article of paragraph 64, wherein the article is formed from a material selected from the group consisting of metals, alloys, composites, plastics, concrete, cast iron, wood, ceramic, paper, film, foil, vinyl, textile, glass, and leather.
66) A process for the formation of a coating composition comprising:

a) reacting a monofunctional amine-terminated polyether and a glycidyl ether of a polyol to form a dispersant;

b) contacting the dispersant and a pigment to form a pigment dispersion;

c) mixing the pigment dispersion and a grind resin.

67) The process of paragraph 66, wherein the glycidyl ether of the polyol comprises aromatic epoxide groups, and wherein 20 to 90 percent of the aromatic epoxide groups of the glycidyl ether of the polyol are reacted with the monofunctional amine-terminated polyether.
68) The process of paragraph 66, wherein the glycidyl ether of the polyol comprises aliphatic epoxide groups, and wherein 20 to 100 percent of the aliphatic epoxide groups of the glycidyl ether of the polyol are reacted with the monofunctional amine-terminated polyether.
69) The process of paragraphs 66 to 68, wherein the monofunctional amine-terminated polyether is a polyetheramine.
70) The process of paragraphs 66 to 68, wherein the monofunctional amine-terminated polyether and the glycidyl ether of the polyol are reacted under a temperature of from about 50° C. to about 150° C.
71) A composition comprising:

a) a pigment component;

b) an effective pigment-dispersing amount of a dispersant having the structure:

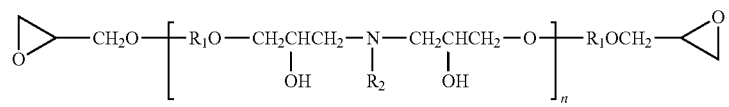

in which $R_1$ may be any $C_1$-$C_{100}$ hydrocarbyl group; $R_2$ may be any alkoxylated hydrocarbyl group defined by the structure:

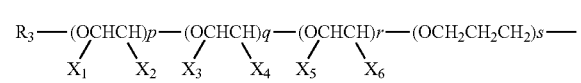

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1; and c) a grind resin.

72) The composition of paragraph 71, wherein the grind resin and the dispersant are the same.
73) The composition of paragraphs 71 or 72, wherein the grind resin comprises a) a styrene, substituted-stryene monomer, or combinations thereof and b) a carboxylated monomer, wherein the carboxylated monomer is selected from the group consisting of substituted or unsubstituted acrylic acid, methacrylic acid, maleic acid, the half esters of maleic acid, citriconic acid, itaconic acid, and combinations thereof.

74) The composition of paragraphs 71 to 73, wherein the grind resin is a styrene acrylate.
75) The composition of paragraphs 71 to 74, wherein the viscosity of the composition is less than or equal to the viscosity of the dispersant for all shear rates, and wherein the viscosity of the composition is less than or equal to the viscosity of the grind resin for all shear rates.

76) The composition of paragraphs 71 to 75, wherein composition comprises from about 0.1 weight % to about 40 weight % grind resin, based on the weight of the pigment.

77) The composition of paragraphs 71 to 76, wherein the pigment component is selected from the group consisting of phthalocyanine, carbon black, titanium oxides, chromates, sulfides, iron oxides, azo lakes, insoluble azo pigment, condensed azo pigments, chelate azo pigments, monoazo pigments, monoarylide, B-naphthol, naphthol AS, benzimidazolone, metal precipitated azo, disazo pigments, diarylide, disazo condensation, diazopyrazoione, bisacetoacetarylide, phthalocyanine pigments, perylenes, perylene, perinone pigments, anthraquinone pigments, quinacridone pigments, dioxazine pigments, thioindigo pigments, isoindolinone pigments, quinophthalone pigments, base dye lakes, acid dye lakes, nitro pigments, nitroso pigments, aniline black daylight fluorescent pigments, graphite carbon, isoindoline, isoindolinon, indigoid, diketopyrrolopyrrole, triarylcarbonium, metal complexes, pearl, liquid crystal pigments, fluorescence, and functional derivatives of the above-mentioned pigments.

78) The composition of paragraphs 71 to 77, wherein the composition comprises from about 1 weight % to about 80 weight % pigment, based on the total weight of the composition.

79) The composition of paragraphs 71 to 78, wherein the composition comprises from about 1 weight % to about 40 weight % pigment, based on the total weight of the composition.

80) The composition of paragraphs 71 to 79, wherein the composition comprises from about 2 weight % to about 10 weight % pigment, based on the total weight of the composition.

81) The composition according to paragraphs 71 to 80 further comprising a solvent.

82) The composition of paragraph 81, wherein the solvent is selected from the group consisting of water; hexane; mineral spirits; toluene; soy bean oil; castor oil; tall oil fatty acids; polyhydric alcohols; glycols; diols; glycol esters; glycol ethers; polyalkyl glycols; lower alkyl ethers of polyhydric alcohols; alcohols having fewer than about 8 carbon atoms per molecule; ketones; ethers; esters; lactams, ethylene glycol, propylene glycol; butanediol; pentanediol; glycerol; propylene glycol laurate; polyethylene glycol; ethylene glycol monomethyl ether, ethylene glycol mono-ethyl ether; ethylene glycol mono-butyl ether; alcohols having fewer than about 8 carbon atoms per molecule such as methanol, ethanol, propanol, iso-propanol; acetone; dioxane; ethyl acetate, propyl acetate, tertiary-butyl acetate, and 2-pyrrolidone.

83) The composition of paragraphs 81 or 82, wherein the amount of said solvent component present is any amount between about 10% and 99% by weight based on the total weight of said composition.

84) The composition of paragraphs 81 to 83, wherein the amount of said solvent component present is any amount between about 50% and 99% by weight based on the total weight of said composition.

85) The use of the dispersant of paragraphs 71 to 84 in a coating composition.

86) An article comprising a coating,
    wherein the coating further comprises:
        a) a pigment component;
        b) an effective pigment-dispersing amount of a dispersant having the structure:

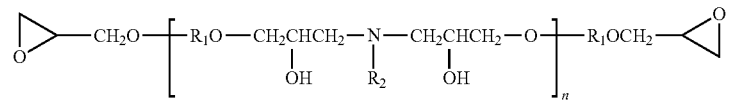

in which $R_1$ may be any $C_1$-$C_{100}$ hydrocarbyl group; $R_2$ may be any alkoxylated hydrocarbyl group defined by the structure:

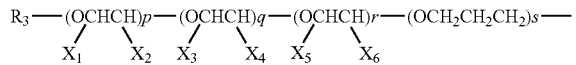

in which $R_3$ is selected from the group consisting of: hydrogen, and any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero; n is any integer between 1 and about 50; and s may be either 0 or 1; and
        c) a grind resin.

87) The article of paragraph 86, wherein the article is formed from a material selected from the group consisting of metals, alloys, composites, plastics, concrete, cast iron, wood, ceramic, paper, film, foil, vinyl, textile, glass, and leather.

88) A process for the formation of a coating composition comprising:
    a) reacting a monofunctional amine-terminated polyether and a glycidyl ether of a polyol to form a dispersant;
    b) contacting the dispersant and a pigment to form a pigment dispersion;
    c) mixing the pigment dispersion and a grind resin.

89) The process of paragraph 88, wherein the glycidyl ether of the polyol comprises aromatic epoxide groups, and wherein 20 to 90 percent of the aromatic epoxide groups of the glycidyl ether of the polyol are reacted with the monofunctional amine-terminated polyether.

90) The process of paragraph 88, wherein the glycidyl ether of the polyol comprises aliphatic epoxide groups, and wherein 20 to 100 percent of the aliphatic epoxide groups of the glycidyl ether of the polyol are reacted with the monofunctional amine-terminated polyether.

91) The process of paragraphs 88 to 90, wherein the monofunctional amine-terminated polyether is a polyetheramine.

92) The process of paragraphs 88 to 90, wherein the monofunctional amine-terminated polyether and the glycidyl ether of the polyol are reacted under a temperature of from about 50° C. to about 150° C.

DETAILED DESCRIPTION

Figure 1:
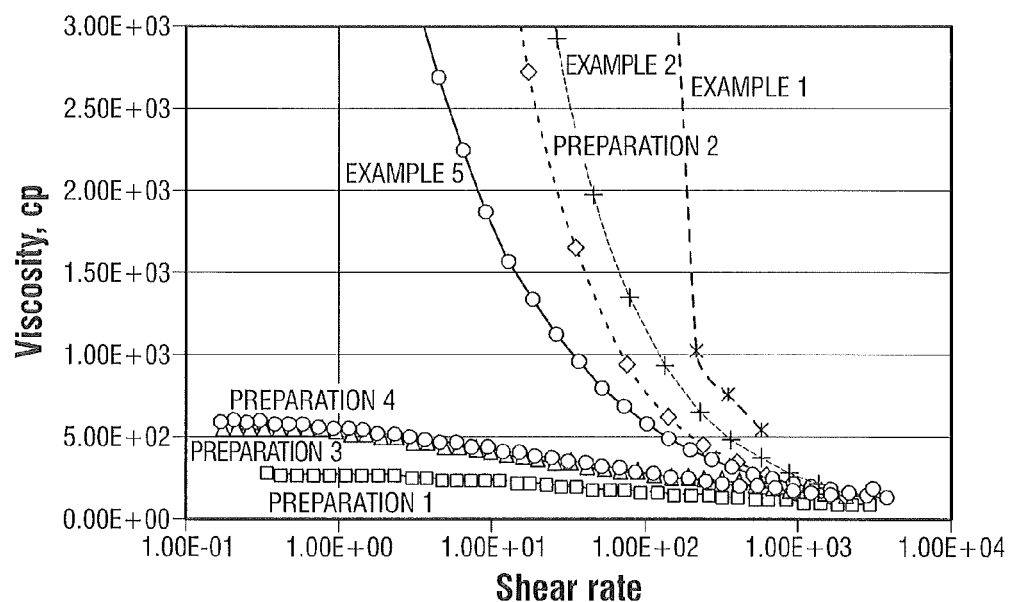
FIG. 1 illustrates the viscosity versus shear rate of various formulations of ink premixes or coating premixes using a dispersant according to the present invention.

A component of a finished liquid ink composition or a pigmented coating composition according to the present invention is a comb polymer, made in accordance herewith, which comb polymer serves to stabilize the pigment against agglomeration in the formulation.

A comb polymer suitable for use in an ink formulation or a pigmented coating composition according to one embodiment of the present invention is formed by reacting a monofunctional, amine-terminated polyether with a glycidyl ether of a polyol. The product resulting from such a process may be conveniently referred to as a polyetheralkanolamine. According to one preferred embodiment of the invention, the amine-terminated polyether (ATP) reactant is present in an amount sufficient to ensure that the total number of reactive hydrogen atoms on the nitrogen atom of the amine(s) present is at least stoichiometrically equal to the amount of epoxide groups present in all glycidyl ethers of a polyols present.

In an embodiment, the present invention provides a process which comprises reacting a monofunctional, amine-terminated polyether ("ATP") with a glycidyl ether of a polyol. A process according to an embodiment of the invention comprises reacting one or more epoxy resins (including without limitation Bisphenol A and its derivatives and analogs) with an ATP having a hydrophilic backbone (such as a polyethylene oxide (PEO) backbone) at elevated temperature, to afford a thermoplastic polyetheralkanolamine having many hydrophilic branches. The polymer molecular weight and physical properties may be controlled by selection of raw materials and ratio of the two starting materials.

A polyetheralkanolamine composition of the present invention may be prepared by reaction of a diglycidyl ether of Bisphenol A (or Bisphenol F) with a mono-functional polyetheramine having a $M_w$ of from about 100 to about 12,000, alternatively from about 400 to about 10,000, alternatively from about 1,000 to about 7,000. The polyether (a.k.a. polyoxyalkylene) chain may be based on a polymer of ethylene oxide, propylene oxide, butylene oxide or any combination of these materials. The reaction may take place at any temperature between about 50° C. and about 150° C., alternatively from about 80° C. to about 140° C., alternatively from about 100° C. to about 130° C. Reaction times vary independently, and may be any time between about 2 and about 10 hours.

In an embodiment, the general reaction scheme for the preparation of a comb polymer according to the present invention is:

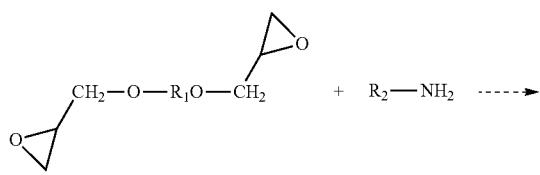

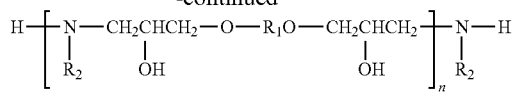

in which an epoxy resin containing at least two epoxy functional end groups is reacted with a primary amine. $R_1$ in the above reaction may be any aliphatic $C_1$ to $C_{100}$ hydrocarbyl group, alternatively any aliphatic $C_6$ to $C_{50}$ hydrocarbyl group, alternatively any $C_{10}$ to $C_{30}$ hydrocarbyl group, alternatively an aromatic hydrocarbyl group; thus the epoxy reactant may be any epoxy resin of at least a functionality of two, and includes without limitation the materials listed under the glycidyl ethers section of this specification.

In the above equation, n is any integer from 1 to about 50, alternatively from 1 to about 40, alternatively from about 2 to about 30; $R_2$ may be any hydrocarbyl group which includes as a part of its molecular structure a portion containing at least two alkoxy groups linked to one another, i.e., the group $R_2$ may be a group:

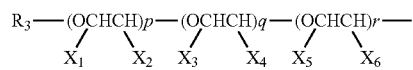

in which $R_3$ is any $C_1$ to about $C_{24}$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen, p, q, and r may each independently be any integer between zero and about 100, including zero, subject to the proviso that at least one of p, q, and r is not zero.

The Amine Component

Such a group $R_2$ as specified above may be incorporated into a polymeric dispersant of the invention by reaction of an amine having the structure:

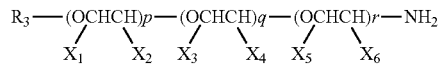

in which the variables are as defined above, with an epoxy resin having at least di-functionality, as previously specified. Thus, the above structures include $R_2$ groups that include both random and block polymers and co-polymers of ethylene oxide, propylene oxide, and butylene oxide. According to one preferred form of the invention, the $M_w$ of the amine reactant is any molecular weight from about 100 to about 12,000, alternatively from about 400 to about 10,000, alternatively from about 1,000 to about 7,000. In cases where mixtures of such amines are employed to produce a polymer provided herein, the preferred molecular weight will be an average molecular weight of all amines present, and the production of alkoxylated amines probably results in the production of a mixture of amines.

Thus, the mono-functional, amine-terminated polyethers used in this invention include mono-amines having a $M_w$ of from about 100 to about 12,000, alternatively from about 400 to about 10,000, alternatively from about 1,000 to about 7,000, which mono-amines include those marketed by Huntsman International LLC of Houston, Tex. under the trademark SURFONAMINE®, as well as analogous compounds offered by other companies comprising polyoxyalkylenated primary amines. Preferred amine-terminated polyethers have a $M_w$ of from about 1,000 to about 7,000. While these particular materials are methoxy terminated, the amine-terminated polyethers used in practice of this invention may be capped with any other groups in which the methyl group of the methoxy group is replaced with a hydrogen or higher hydrocarbon such as ethyl, propyl, butyl, etc., including any hydrocarbyl substituent which comprises up to about 18 carbons. In an embodiment, the amine termination is a primary amine group. Thus, mono-functional amine-terminated polyethers useful in accordance with one embodiment of the present invention may have the general structure:

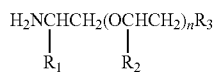

in which $R_1$ and $R_2$ are each independently selected from the group consisting of: hydrogen and any $C_1$ to $C_4$ hydrocarbyl group; $R_3$ is independently selected from the group consisting of: hydrogen, methyl, methoxy, ethoxy, and hydroxy; and wherein n is any integer in the range of from about 4 to about 100, alternatively form about 5 to about 90, alternatively from about 10 to about 70, and including mixtures of isomers thereof. Such materials are available from Huntsman International LLC of Houston, Tex.

The Glycidyl Ether Component

The glycidyl ethers of polyols useful in providing a composition according to the present invention are generally known as "epoxy resins" which include various epoxy resins including conventional, commercially-available, epoxy resins. In addition, mixtures including any two or more epoxy resins may be employed in any ratio of combination with one another to provide a mixture with which a primary amine as set forth herein may be reacted. In general, the epoxy resins can be glycidated resins, cycloaliphatic resins, epoxidized oils and so forth. The glycidated resins are frequently formed as the reaction product of a glycidyl ether, such as epichlorohydrin, and a bisphenol compound such as bisphenol A. $C_2$-$C_{28}$, alternatively from about $C_4$ to about $C_{22}$, alternatively from about $C_6$ to about $C_{20}$ alkyl glycidyl ethers; $C_2$-$C_{28}$ alternatively from about $C_4$ to about $C_{22}$, alternatively from about $C_6$ to about $C_{20}$ alkyl-and-alkenyl-glycidyl esters; $C_1$-$C_{28}$, alternatively from about $C_2$ to about $C_{22}$, alternatively from about $C_4$ to about $C_{20}$ alkyl-, mono- and poly-phenol glycidyl ethers; polyglycidyl ethers of pyrocatechol, resorcinol, hydroquinone, 4-4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxy-3,3'-dimethyldiphenyl propane, 4,4'-dihydroxydiphenyl sulfone, and tris(4-hydroxyphenyl)methane; polyglycidyl ethers of NOVOLAC® resins; polyglycidyl ethers of diphenols obtained by esterifying ethers of di-phenols obtained by esterifying salts of an aromatic hydrocarboxylic acid with a dihaloalkane or dihalogen dialkyl ether; polyglycidyl ethers of polyphenols obtained by condensing phenols and long chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; and combination thereof. Commercially-available epoxy resins that may be used in the practice of this invention include but are not limited to ARALDITE® GY6010 resin (Huntsman Advanced Materials LLC), ARALDITE® 6010 resin (Huntsman Advanced Materials LLC), EPON® 828 resin (Resolution Polymers), and DER® 331 resin (the Dow Chemical Co.). Thus in an embodiment, the $R_1$ group of a dispersant according to the present invention, may be a hydrocarbyl residue derived from a material as described above.

In an embodiment, the amine-terminated polyether and glycidyl ether of a polyol are present in such amounts that the amine group of the polyether is able to be consumed by reacting with essentially all of the epoxide functionality of the glycidyl ether. Thus, during the reaction and in an embodiment, the amount of amine-terminated polyether is stoichiometrically equal to or greater than the amount of epoxide in the glycidyl ether of a polyol. The resulting product may have little, if any, unreacted epoxide functionality left after the reaction. In an embodiment, from about 85 to about 100% of the epoxide groups of the starting material are reacted. In an alternative embodiment, at least 90% of the epoxide groups of the starting material are reacted. In a still further embodiment, at least 95% of the epoxide groups of the starting material are reacted.

Depending on the starting amount used of a primary amine, it is possible to form either a secondary or tertiary amine in the final product. It is therefore possible to form products which contain repeating units where an ATP has reacted with two epoxide groups to form a tertiary amine. This result may be depicted by the following representative formula: $RNHCH_2CHOHCH_2—[—O-A-O—CH_2CHOHCH_2NRCH_2CHOHCH_2—O]—_x-A-O—CH_2CHOHCH_2—NRH$ in which R represents the capped polyether portion of the ATP; A represents a hydrocarbyl radical, such as the hydrocarbon portion of hydrogenated bisphenol A; and x can vary from 0—if no tertiary amines are present—to about 100, alternatively from 1 to about 80, alternatively from about 2 to about 50. Typically, this reaction can occur at any temperature in the range of from about 50° C. to about 150° C., alternatively from about 80° C. to about 140° C., alternatively from about 100° C. to about 130° C., under ambient pressure.

The comb polymer component of the ink formulation or the pigmented coating composition according to the present invention typically comprises any amount between about 0.5 to about 25% by weight, based on the total weight of all pigment solids present in the ink formulation or pigmented coating composition. According to an alternative embodiment, the comb polymer component of an ink formulation or pigmented coating composition according to the present invention typically comprises any amount between about 1% to about 10% by weight, based on the total weight, of all pigment solids present in the ink formulation or the pigmented coating composition.

Pigment

The pigment component of the present invention is typically an insoluble colorant material, such as phthalocyanine. However, a wide variety of organic and/or inorganic pigments may be present in an ink composition or a pigmented coating composition according to the present invention. Representative examples of inorganic pigments are carbon black, titanium oxides, chromates, sulfides, and iron oxides. Representative examples of organic pigments are azo pigments (such as azo lakes, insoluble azo pigment, condensed azo pigments, chelate azo pigments, monoazo pigments, including monoarylide, B-naphthol, naphthol AS, benzimidazolone, and metal precipitated azo, as well as disazo pigments, including diarylide, disazo condensation, diazopyrazoione, and bisacetoacetarylide), polycyclic pigments (such as phthalocyanine pigments, perylenes, perylene, and perinone pigments, anthraquinone pigments, quinacridone pigments, dioxazine pigments, thioindigo pigments, isoindolinone pigments, and quinophthalone pigments), lake pigments (such as base dye lakes, and acid dye lakes), nitro pigments, nitroso pigments, and aniline black daylight fluorescent pigments. Other pigments may include isoindoline, isoindolinon, indigoid, diketopyrrolopyrrole, triarylcarbonium, metal complexes, pearl, liquid crystal pigments, fluorescence, and functional derivatives of the above-mentioned pigments. Additionally, suitable pigments may include those that are dispersed in a water phase or those whose surfaces have been treated with a surfactant or a polymeric dispersing agent (such as graphite carbon).

The amount of pigments present in an ink formulation or pigmented coating composition, according to the present invention, may vary depending upon the structure, and they may be present in any amount ranging from about 1% to about 50%, alternatively from about 1 to about 40, and in another embodiment, from about 2% to about 10% by weight, based on the total weight of ink or pigmented coating composition.

Carrier Medium (Solvent) Component

The ink composition or pigmented coating composition may include a solvent, which is sometimes referred to as the carrier medium. The carrier medium can be either aqueous or non-aqueous. When aqueous, the carrier medium may be water or may comprise a mixture of water and at least one organic solvent which is soluble in water to an appreciable extent. One preferred water-soluble organic solvent comprises one or more polyhydric alcohols. In an embodiment, suitable polyhydric alcohols include ethylene glycol, propylene glycol, and diols such as butanediol, pentanediol. Glycols and glycol esters are also useful, and include those such as glycerol, propylene glycol laurate; polyalkyl glycols such as polyethylene glycol; and lower alkyl ethers of polyhydric alcohols, such as ethylene glycol monomethyl ether, ethylene glycol mono-ethyl ether and ethylene glycol mono-butyl ether.

Other suitable water-soluble organic solvents include lower alcohols and all their isomers having fewer than about 8 carbon atoms per molecule such as methanol, ethanol, propanol, iso-propanol; ketones such as acetone; ethers such as dioxane; esters such as ethyl acetate, propyl acetate, and lactams such as 2-pyrrolidone.

Still further suitable solvents include aliphatics such as hexane and mineral spirits; aromatics such as toluene; triglycerides such as soy bean oil and castor oil; and fatty acids such as tall oil fatty acids.

The amount of solvent present in the ink formulation or the pigmented coating composition according to the invention is any amount in the range of between about 10% to about 99%, alternatively from about 10% to about 90%, alternatively from about 50 to about 99%, alternatively from about 70% to about 99.8% based on total weight of the ink formulation or the pigmented coating composition. Selection of the particular ink composition or the coating composition as being suitable for a given final-use formulation depends on requirements of the specific application, such as desired surface tension and viscosity, the selected pigment, drying time of the pigmented ink jet ink, type of paper onto which the ink will be printed, and proprieties of the final coating film formation such as gloss, color strength, and transparency as is generally recognized or appreciated by a person of ordinary skill in the art.

Grind Resins

Pigments may be incorporated into a pigmented coating compositions by mixing a pigment dispersion and a grind resin. Suitable grind resins typically comprise the polymerized residue of the styrene and/or substituted-styrene monomer and a carboxylated monomer. In an embodiment, the carboxylated monomer is selected from the group consisting of substituted or unsubstituted acrylic acid, methacrylic acid, maleic acid, the half esters of maleic acid, citriconic acid, itaconic acid, and combinations thereof. An example of a suitable grind resin is JONCRYL® 63 available from Johnson Polymer Sturtevant, Wis. The molecular weight of JONCRYL® 63 is about 13,000. In an alternative embodiment, the grind resin and the pigment dispersion are the same. In this embodiment, an additional amount of pigment dispersion acts as a grind resin.

The pigment dispersion and the grind resin may be mixed using mills such as a ball mill, grind mill, continuous mill, or by any other means that effectively integrates the pigment dispersion into the grind resin. In general, the pigmented dispersion and grind resin are effectively integrated when the desired particle size of the pigment is achieved, the pigment is appropriately wetted by the grinding resin, and the pigment is uniformly dispersed throughout the grind resin.

In an embodiment, the grind resin is present in an amount from about 0.1 percent to about 40 percent by weight based on the pigment. In an alternative embodiment, the grind resin is present in an amount from about 1 percent to about 30 percent by weight based on the pigment. In a still further embodiment, the grind resin is present in an amount from about 2 percent to about 20 percent by weight based on the pigment. In an embodiment, the size of the pigment is less than or equal to about 1 micron after grinding, as measured by ultrasound technology using DT-1200, which is manufactured by Dispersion Technologies Company.

Without wishing to be bound by the theory, Applicant believes that there is a synergy between comb polymers of the present invention and grind resins, particularly wherein the grind resin is a styrene acrylate. An embodiment of this synergistic effect is illustrated with reference to FIG. 2, wherein the viscosity of the blended composition is less than, or equal to, both the viscosity of the grind resin and the viscosity of the comb polymer.

Other Additives

An ink or coating pigment concentrate according to the present invention may be suitably prepared by combining the various components and mixing them in a blender to homogenize, and grinding them in a bead mill. In an embodiment, the blender may be an ordinary kitchen blender. Optionally, a surfactant may be added to wet the pigment and modify the surface tension of the ink to control penetration of the ink into the paper. Examples of suitable surfactants include nonionic, amphoteric, anionic, zwitterionic, and cationic surfactants, and those of ordinary skill in this art are aware of the surfactants employed in this field. Other additives such as binders (resins), biocides, humectants, chelating agents, viscosity modifiers, and defoamers may also be present in an ink composition according to the invention. Optionally, acrylic and non-acrylic polymers may be added to improve properties such as water fastness and smear resistance. These may be solvent based, emulsions, water soluble polymers, coalescing aids, anti-settling, thixotropes, or plasticizers.

The following examples are provided as illustrative examples of the invention and shall not be construed as delimitive of the scope of the present invention whatsoever.

Preparation of Comb Polymers

Preparative Example 1

200 grams ("g") of molten SURFONAMINE® L-200 amine (0.2 equivalent) having a $M_w$ of 2000 and a PO/EO ratio of about 2/42 was charged to a 1-liter flask equipped with a mechanical stirrer and thermometer. Then 37.6 g of ARALDITE® GY6010 diglycidyl ether of bisphenol A of equivalent weight 188 (0.2 equivalent) was added. The flask was heated to 120° C. for 7 hours and then the temperature of the liquid was lowered to 70° C. for 1 hour, after which the product was discharged. The resulting water-soluble polyetheralkanolamine was a solid at 25° C. Its number average molecular weight was about 4609 and weight average molecular weight was about 6155. Its surface tension was 51 dyne/cm at 100 ppm.

Preparative Example 2

To a small, wide mouth glass bottle was added SURFONAMINE® L-100 amine having a $M_w$ of 1000, and PO/EO ratio of 3/19 (100 g, 0.2 mole equivalent) and EPON® 828 epoxy resin (30 g, 0.16 mole equivalent). The mixture was swirled to a homogeneous off-white solution and placed in a 100° C. oven for five hours. The product at 25° C. was a soft, waxy semi-solid. The product was water soluble had a number average molecular weight of about 3413, and weight average molecular weight of about 4973. The surface tension of the product was about 48 dyne/cm at 100 ppm.

Preparative Example 3

300 g of molten SURFONAMINE® L-300 amine (0.2 equivalent) having a $M_w$ of 3000 and a PO/EO ratio of about 8/58 was placed in a 1-liter flask equipped with a mechanical stirring, and thermometer. Then 37.6 g of ARALDITE® GY6010 (a diglycidyl ether of bisphenol A, having 188 equivalent weight), 0.2 equivalent, was added. The flask was heated to 120° C. for 7 hours and the temperature of the liquid was then lowered to 70° C. for about 1 hour, after which the product was discharged. The resulting polyetheralkanolamine was a solid at room temperature and water soluble. It had a number average molecular weight of about 4876 and weight average molecular weight of about 6713.

Preparative Example 4

300 g of SURFONAMINE® L-207 amine (0.3 equivalent) having a $M_w$ of 2000 and a PO/EO ratio of about 10/31 was placed in a 1-liter flask equipped with a mechanical stirring, and thermometer. Then 56.4 g of ARALDITE® GY6010 (a diglycidyl ether of bisphenol A, having 188 equivalent weight), 0.3 equivalent, was added. The flask was heated to 120° C. for 6 hours and the temperature of the liquid was then lowered to 70° C. for about 1 hour, after which the product was discharged. The resulting polyetheralkanolamine was water soluble. It had a number average molecular weight of about 3719 and weight average molecular weight of about 4657. The surface tension of the product was about 47 dyne/cm at 100 ppm.

Preparative Example 5

To a small, wide mouth glass bottle was added SURFONAMINE® L-100 amine having a $M_w$ of 1000, and PO/EO ratio of 3/19 (102.2 g, 0.2 mole equivalent), SURFONAMINE® B-100 amine having a molecular weight of 1000, and PO of 12.5 (61.3 g, 0.12 mole equivalent) and ARALDITE® GY6010 resin (61.5 g, 0.33 mole equivalent). The mixture was swirled to a homogeneous off-white solution and placed in a 120° C. oven for eight hours. The product was water soluble and had a number average molecular weight of about 3915, and weight average molecular weight of about 5996.

Preparative Example 6

300 g of SURFONAMINE® L-100 amine (0.6 equivalent) having a $M_w$ of 1000 and a PO/EO ratio of about 3/19 was placed in a 1-liter flask equipped with a mechanical stirring, and thermometer. Then 200 g of SURFONAMINE® B-200 amine (0.2 equivalent) having a molecular weight of 2000, and a PO/EI ratio of 29/6 was added. The flask was heated to 75° C. and 150.4 g of ARALDITE® GY6010 resin (a diglycidyl ether of bisphenol A, having 188 equivalent weight), 0.8 equivalent, was added. The flask was heated to 120° C. for 6 hours and then the temperature of the liquid was lowered to 70° C., after which the product was discharged. The resulting polyetheralkanolamine was water soluble. It had a number average molecular weight of about 3115 and weight average molecular weight of about 6128.

Preparative Example 7

To a small, wide mouth glass bottle was added SURFONAMINE® L-100 amine having a $M_w$ of 1000, and PO/EO ratio of 3/19 (100 g, 0.2 mole equivalent), and EPON® 862 (a Bisphenol F resin, 34.3 g, 0.2 mole equivalent). The mixture was swirled to a homogeneous off-white solution and placed in a 120° C. oven for 10 hours. The final polymer was a solid at room temperature and was water soluble.

Preparative Example 8

To a small, wide mouth glass bottle was added SURFONAMINE® L-100 amine having a $M_w$ of 1000, and PO/EO ratio of 3/19 (100 g, 0.2 mole equivalent), and EPONEX® 1510 resin (a hydrogenated Bisphenol A resin, 45 g, 0.2 mole equivalent). The mixture was swirled to a homogeneous off-white solution and placed in a 120° C. oven for 7 hours. The final polymer was a solid at room temperature and was water soluble.

COMPARATIVE EXAMPLES

These are materials currently offered to the market as dispersants for use in inks and like formulations and suitable more or less, for various end-use applications:

Example 1

Styrene-methacrylate copolymer ($M_w$~12,000 and 30% styrene and 70% methacrylic acid by weight). This type of copolymer is mentioned in U.S. Pat. No. 4,597,794;

Example 2

Styrene-methacrylate copolymer ($M_w$~12,000 and 50% styrene and 50% methacrylic acid by weight). This type of copolymer is mentioned in U.S. Pat. No. 4,597,794;

Example 3

Comb polymer of methacrylic acid/maleic anhydride/ SURFONAMINE® B-30 amine;

Example 4

SURFYNOL® CT-136 SURFACTANT, a surfactant for pigment grinding, supplied by Air Products Company;

Example 5

DISPERBYK-190 dispersant, a pigment dispersant, supplied by BYK-Chemie, Inc;

Example 6

SURFONAMINE® L-100 amine, made and sold by Huntsman International LLC of Texas;

Example 7

SURFONAMINE® L-200 amine, made and sold by Huntsman International LLC of Texas;

Example 8

SURFONAMINE® L-300 amine, made and sold by Huntsman International LLC of Texas;

Example 9

SURFONAMINE® L-207 amine, made and sold by Huntsman International LLC of Texas;

Example 10

SURFYNOL® CT-324 surfactant, a surfactant for pigment grinding, supplied by Air Products Company;

Premix (Pigment Concentrate) Formulations

The method of preparation of the following premix formulations involves weighing the JONCRYL® 63 (binder), water, dispersant, into a beaker and mixed at low shear using a Silverson model L4RT-A mixer until they were uniform. Then the pigment (carbon black) was added in three portions and mixed well to wet the particles between additions. After complete incorporation of the pigment, this composition (termed the premix) was mixed for 10 minutes at high shear to begin the process of wetting and de-agglomeration of the pigment concentrates.

Formulation 1

| Component | Weight % |
| --- | --- |
| Regal 660R (carbon black) | 38.0 |
| Dispersant | 2.0* |
| JONCRYL ® 63 (30.5% of styrene acrylic Resin from S.C Johnson Polymer, binder) | 25.53 |
| Byk ® 022 de-foamer, from BYK-Chemie | 0.7 |
| Water | 33.77 |

*Calculated based on 100% active

Formulation 2

| Component | Weight % |
| --- | --- |
| Regal 660R (carbon black) | 35.7 |
| Dispersant | 2.0* |
| JONCRYL ® 63 (30.5% of styrene acrylic Resin from S.C Johnson Polymer, binder) | 27.4 |
| Byk ® 022 de-foamer, from BYK-Chemie | 0.9 |
| Water | 34.0 |

*Calculated based on 100% active

The viscosities of the premix were measured using a Bohlin Instruments, model CVO 120 Rheometer and Brookfield Viscometer.

Preparation of Pigment Concentrate (Dispersion)

A premix per the above was then milled on an Eiger Mini 100 horizontal media mill for 20 minutes to afford a dispersion.

Testing Procedures:
1) Tint strength (Sherwin Williams Superpaint Flat Interior Latex Extra White to dispersion, 50 parts to 0.50 parts respectively)—mixed on a Hauschild mixer for 1 minute at 1800 rpm. Drawdowns of the tint mixture versus standard were made on Leneta 3NT-4 regular bond stock using a #20 wire wound rod.
2) Viscosity was measured using a Brookfield Viscometer.
3) Finished ink testing—color, transparency, gloss (all on prints made with 360P 113 anilox on Leneta 3NT-3, film, and foil), viscosity. The inks were made by using 30 parts letdown vehicle and 20 parts of dispersion. The vehicle contains: 65% ECO® 2177 acrylic emulsion (from S.C. Johnson), 25% JONCRYL® 60 (34% solution of JONCRYL® 678 styrene acrylic resin, and 10% water. The vehicle and dispersion were weighed into Max 60 Hauschild containers and mixed 1 minute at 1800 rpm.

Comparative Viscosities of Pre-Mixes

FIG. 1 illustrates the viscosities of premix Formulation 1 using dispersants from Preparation 1, Preparation 2, Preparation 3, Preparation 4 (present invention), and the viscosities of Example 1, Example 2, and Example 5.

Water Contact Angle Tests

A water contact angle was measured on a glass slide coated with a premix Formulation 1. The coated slide was dried at room temperature prior to the contact angle measurement. A low contact angle indicates that the dispersant wets the pigment (carbon black) and thereby increasing dispersibility.

|  | Contact Angle, degrees |
|---|---|
| Untreated (no dispersant) | 86.5 |
| Example 5 | 55.6 |
| Preparation 1 | 25.9 |
| Example 7 | 45.4 |

Viscosity Measurements

The viscosities of the dispersion of Formulation 2 containing a dispersant were measured using a Brookfield Viscometer and listed below:

| Dispersant | Viscosity at 30 rpm, cps |
|---|---|
| Preparation 1 | 60 (liquid) |
| Preparation 4 | 240 (liquid) |
| Example 4 | Too high to measure (paste) |
| Example 10 | Too high to measure (paste) |
| Example 1 | Too high to measure (paste) |
| Example 2 | Too high to measure (paste) |
| Example 6 | Too high to measure (paste) |
| Example 7 | Too high to measure (paste) |
| Example 8 | Too high to measure (paste) |
| Example 9 | Too high to measure (paste) |

Ink Viscosities at Various Times

The following shows the pigment concentrate viscosities using Formulation 2 after 24 hours.

| RPM | Untreated | Example 4 | Example 10 | Preparation 1 | Preparation 4 | Preparation 2 |
|---|---|---|---|---|---|---|
| 1.5 | 2227 | 2850 | 2887 | 197 | 213 | 2217 |
| 3 | 1320 | 1593 | 1628 | 171 | 160 | 1005 |
| 6 | 819 | 971 | 1002 | 160 | 143 | 619 |
| 12 | 538 | 630 | 638 | 152 | 140 | 416 |
| 30 | 341 | 400 | 398 | 147 | 135 | 293 |
| 60 | 250 | 297 | 290 | 143 | 130 | 204 |

Dispersion Tint Strength Observations

The following table compares the dispersion tint strength of various dispersants using equivalent amounts of the dispersants in a plurality of renditions of Formulation 2.

| Additive | Tint Strength |
|---|---|
| Example 4 | 100.00 |
| Example 10 | 98.27 |
| Example 2 | 104.71 |
| Example 5 | 107.3 |
| Preparative example 1 | 111.08 |

The following table compares the gloss 60° angle of carbon black ink of various dispersants using formulation 1:

| Additive | Gloss |
|---|---|
| Preparative example 1 | 43 |
| Example 10 | 36.8 |
| Example 4 | 38.5 |

Example 11

A blend containing 15% polyetheralkanol amine comb polymer (see Preparation 7 cited above), 11.25% water, 11.25% polyethylene glycol (MW 400), and 62.5% JONCRYL® 63 was made by mixing at room temperature with an overhead mixer for 30 minutes. The blend ("Blend 1") was first mixed with water and defoamer and then carbon black was finally added slowly, according to the following formulation:

| Component | Weight % |
|---|---|
| Regal ® 660R (carbon black) | 38.5 |
| Blend 1 (34% solid) | 19.25 |
| Byk ® 022 (defoamer) | 1.00 |
| Water | 41.25 |

In this example, Blend 1 was used at 15% active on pigment.

The premix was mixed at 3000 rpm for 3 minutes using a SpeedMixer™ and then was milled at 3000 rpm for 3 minutes. The viscosity of the pigment concentrate was measured using a Bohlin Rheometer.

Example 12

In this example, Disperbyk 190 dispersant (40% solid), supplied by BYK Chemie, was used at 20% active on pigment.

| Component | Weight % |
|---|---|
| Regal ® 660R (carbon black) | 38.5 |
| Disperbyk 190 (40% solid) | 19.25 |
| Byk ® 022 (defoamer) | 1.00 |
| Water | 41.25 |

The premix was mixed at 3000 rpm for 3 minutes using a SpeedMixer™ and then was milled at 3000 rpm for 3 minutes. The viscosity of the pigment concentrate was measured using a Bohlin Rheometer.

Example 13

| Component | Weight % |
|---|---|
| Regal ® 660R (carbon black) | 38.5 |
| Blend 1 (34% solid) | 28.31 |
| Byk ® 022 (defoamer) | 1.00 |
| Water | 32.19 |

The premix was mixed at 3000 rpm for 3 minutes using a SpeedMixer™ and then was milled at 3000 rpm for 3 minutes. The viscosity of the pigment concentrate was measured using a Bohlin Rheometer.

In this example, the dosage of Blend 1 was 25% active on pigment.

Example 14

| Component | Weight % |
| --- | --- |
| Regal ® 660R (carbon black) | 38.5 |
| JONCRYL ® 63 (30.5% solid) | 31.56 |
| Byk ® 022 (defoamer) | 1.00 |
| Water | 28.94 |

The premix was mixed at 3000 rpm for 3 minutes using a SpeedMixer™ and then was milled at 3000 rpm for 3 minutes. The viscosity of the pigment concentrate was measured using a Bohlin Rheometer.

In this example, JONCRYL®63 was used at 25% active on pigment.

Example 15

| Component | Weight % |
| --- | --- |
| Regal ® 660R (carbon black) | 38.5 |
| Preparation 7 (100% solid) | 9.625 |
| Byk ® 022 (defoamer) | 1.00 |
| Water | 50.875 |

The premix was mixed at 3000 rpm for 3 minutes using a SpeedMixer™ and then was milled at 3000 rpm for 3 minutes. The viscosity of the pigment concentrate was measured using a Bohlin Rheometer.

In this example, Preparation 7 above was used at 25% active on pigment.

Example 16

| Component | Weight % |
| --- | --- |
| Regal ® 660R (carbon black) | 38.5 |
| Preparation 7 (100% solid) | 7.7 |
| Byk ® 022 | 1.00 |
| Water | 54.8 |

The premix was mixed at 3000 rpm for 3 minutes using a SpeedMixer™ and then was milled at 3000 rpm for 3 minutes. The viscosity of the pigment concentrate was measured using a Bohlin Rheometer.

In this example, Preparation 7 above was used at 20% active on pigment.

Example 17

| Component | Weight % |
| --- | --- |
| Regal ® 660R (carbon black) | 38.5 |
| EXP 8451-30-2 (37.6% solid) | 10.24 |
| Byk ® 022 | 1.00 |
| Water | 50.26 |

In Example 17, 24% Preparation 7 above, 18% water, 18% polyethylene glycol ($M_w$ of 400), and 40% JONCRYL® HPD 96 from Johnson Polymer were blended together to form Blend 2. The dosage of Blend 2 was 10% active on pigment.

Blend 2 was made at room temperature with an overhead mixer for 30 minutes. The premix was mixed at 3000 rpm for 3 minutes using a SpeedMixer™ and then was milled at 3000 rpm for 3 minutes. The viscosity of the pigment concentrate was measured using a Bohlin Rheometer.

Figure 2:
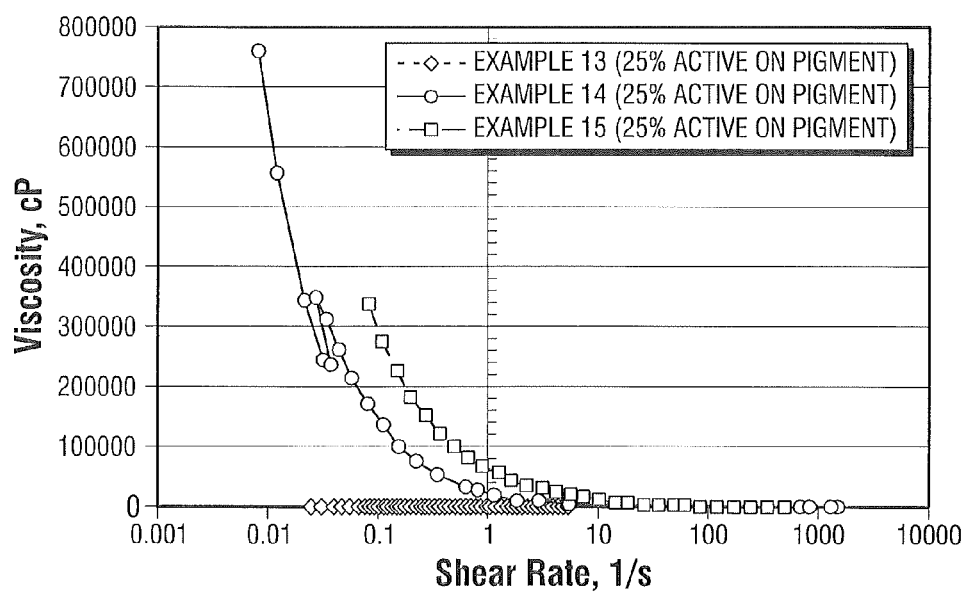
FIG. 2 illustrates the viscosity versus shear rate of carbon black dispersion concentrates, wherein the dispersant comprises 25% carbon black based on pigment.
Figure 3:
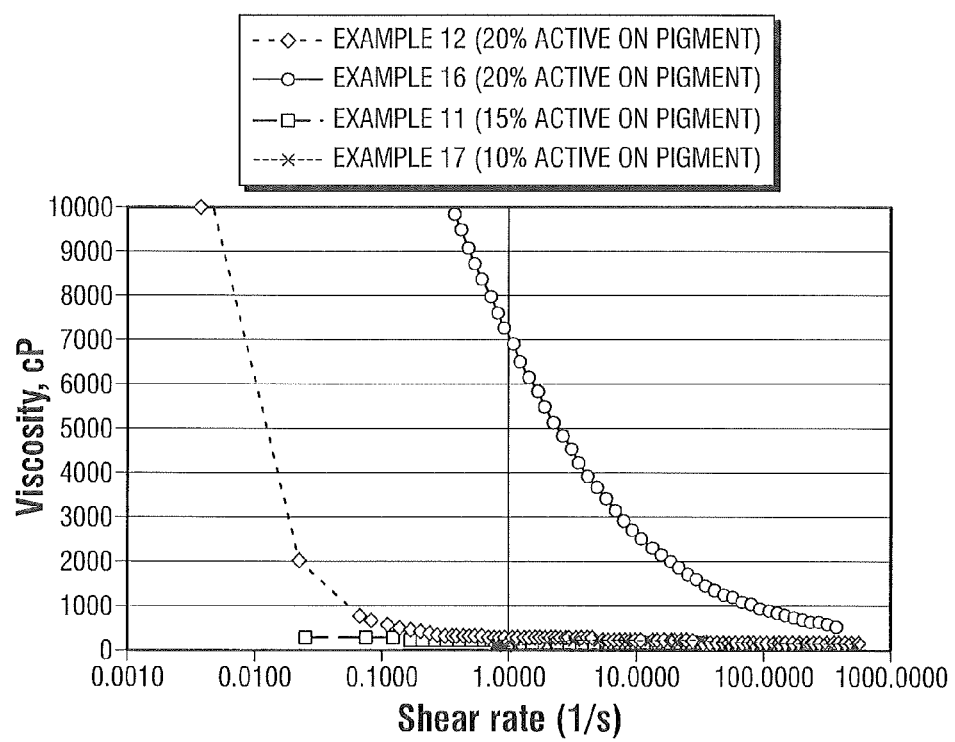
FIG. 3 illustrates the viscosity versus shear rate of carbon black dispersion concentrates, wherein the dispersant comprises 20% carbon black or less based on pigment.

FIGS. 1 and 2 compare the viscosities of various dispersants in carbon black dispersions.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. The present disclosure includes the subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claim so modified. This also includes combination of the features and/or limitations of one or more of the independent claims with the features and/or limitations of another independent claim to arrive at a modified independent claim, with the remaining dependent claims in their original text being read and applied to any independent claim so modified. Accordingly, the presently disclosed invention is intended to cover all such modifications and alterations, and is limited only by the scope of the claims which follow, in view of the foregoing and other contents of this specification.

What is claimed is:

1. A process for the formation of an ink or coating composition comprising:

a) reacting a monofunctional amine-terminated polyether and a glycidyl ether of a polyol to form a dispersant having the structure:

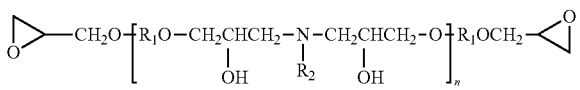

wherein n is any integer from about 2 to about 30; $R_1$ is a $C_1$-$C_{100}$ hydrocarbyl group; and $R_2$ is an alkoxylated hydrocarbyl polymer group having a weight average molecular weight between 1,000 and 7,000 Daltons and is defined by the structure:

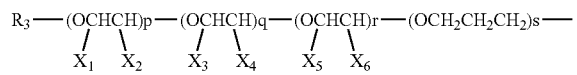

in which $R_3$ is selected from the group consisting of hydrogen and any $C_1$ to $C_{24}$ hydrocarbyl group; $X_1$, $X_2$, $X_3$, $X_4$, $X_5$, and $X_6$ in each occurrence are independently selected from the group consisting of: hydrogen, methyl, and ethyl, subject to the proviso that at least one of the two X groups that are attached to the same alkoxy unit is hydrogen; p, q, and r are each independently any integer between zero and about 100, including zero, subject to the proviso that at least one of p, q, and r is not zero; and s is 0 or 1; and b) contacting an amount of the dispersant and a pigment to form a pigment dispersion, wherein the amount of the dispersant is such that the dispersant is present in the ink or coating composition in a range of from about 0.5% to about 25% based on a total weight of the ink or coating composition.

2. The process of claim 1, wherein the glycidyl ether of the polyol comprises aromatic epoxide groups, and wherein 20 to 90 percent of the aromatic epoxide groups of the glycidyl ether of the polyol are reacted with the monofunctional amine-terminated polyether.

3. The process of claim 1, wherein the glycidyl ether of the polyol comprises aliphatic epoxide groups, and wherein 20 to 100 percent of the aliphatic epoxide groups of the glycidyl ether of the polyol are reacted with the monofunctional amine-terminated polyether.

4. The process of claim 1, wherein the monofunctional amine-terminated polyether is a polyetheramine.

5. The process of claim 1, wherein the monofunctional amine-terminated polyether and the glycidyl ether of the polyol are reacted under a temperature of from about 50° C. to about 150° C.

6. The process of claim 1, wherein the pigment is selected from the group consisting of phthalocyanine, carbon black, titanium oxides, chromates, sulfides, iron oxides, azo lakes, insoluble azo pigment, condensed azo pigments, chelate azo pigments, monoazo pigments, monoarylide, B-naphthol, naphthol AS, benzimidazolone, metal precipitated azo, disazo pigments, diarylide, disazo condensation, diazopyrazoione, bisacetoacetarylide, phthalocyanine pigments, perylenes, perylene, perinone pigments, anthraquinone pigments, quinacridone pigments, dioxazine pigments, thioindigo pigments, isoindolinone pigments, quinophthalone pigments, base dye lakes, acid dye lakes, nitro pigments, nitroso pigments, aniline black daylight fluorescent pigments, graphite carbon, isoindoline, isoindolinon, indigoid, diketopyrrolopyrrole, triarylcarbonium, metal complexes, pearl, liquid crystal pigments, fluorescence, functional derivatives of the above-mentioned pigments, and combinations thereof.

7. The process of claim 1, wherein the process further comprises adding a solvent before or after the formation of the pigment dispersion.

8. The process of claim 7, wherein the solvent is selected from the group consisting of water; hexane; mineral spirits; toluene; soy bean oil; castor oil; tall oil fatty acids; polyhydric alcohols; glycols; diols; glycol esters; glycol ethers; polyalkyl glycols; lower alkyl ethers of polyhydric alcohols; alcohols having fewer than 8 carbon atoms per molecule; ketones; ethers; esters; lactams; ethylene glycol; propylene glycol; butanediol; pentanediol; glycerol; propylene glycol laurate; polyethylene glycol; ethylene glycol monomethyl ether; ethylene glycol mono-ethyl ether; ethylene glycol mono-butyl ether; alcohols having fewer than 8 carbon atoms per molecule methanol, ethanol, propanol, iso-propanol; acetone; dioxane; ethyl acetate; propyl acetate; tertiary butyl acetate; 2-pyrrolidone; and combinations thereof.

9. The process of claim 7, wherein the solvent is added in an amount such that the solvent is present in the ink or coating composition in a range of from about 50% to about 99% based on a total weight of the ink or coating composition.

10. The process of claim 1, wherein the process further comprises mixing the pigment dispersion with a grind resin.

11. The process of claim 10, wherein the grind resin comprises:
a) at least one of a styrene and a substituted-styrene monomer; and
b) a carboxylated monomer, wherein the carboxylated monomer is selected from the group consisting of substituted or unsubstituted acrylic acid, methacrylic acid, maleic acid, the half esters of maleic acid, citriconic acid, itaconic acid, and combinations thereof.

12. The process of claim 10, wherein the grind resin comprises a styrene acrylate.

13. The process of claim 10, wherein the grind resin and the dispersant are the same.

14. The process of claim 10, wherein the process further comprises adding a solvent (a) before the formation of the pigment dispersion, (b) after the formation of the pigment dispersion, (c) after mixing the pigment dispersion and the grind resin, or (d) combinations thereof.

15. The process of claim 14, wherein the solvent is selected from the group consisting of water; hexane; mineral spirits; toluene; soy bean oil; castor oil; tall oil fatty acids; polyhydric alcohols; glycols; diols; glycol esters; glycol ethers; polyalkyl glycols; lower alkyl ethers of polyhydric alcohols; alcohols having fewer than 8 carbon atoms per molecule; ketones; ethers; esters; lactams; ethylene glycol; propylene glycol; butanediol; pentanediol; glycerol; propylene glycol laurate; polyethylene glycol; ethylene glycol monomethyl ether; ethylene glycol mono-ethyl ether; ethylene glycol mono-butyl ether; alcohols having fewer than 8 carbon atoms per molecule methanol, ethanol, propanol, iso-propanol; acetone; dioxane; ethyl acetate; propyl acetate; tertiary butyl acetate; 2-pyrrolidone; and combinations thereof.

16. The process of claim 14, wherein the solvent is added in an amount such that the solvent is present in the ink or coating composition in a range of from about 50% to about 99% based on a total weight of the ink or coating composition.

* * * * *